(12) United States Patent
Randall

(10) Patent No.: US 11,009,182 B2
(45) Date of Patent: May 18, 2021

(54) MULTI-FUNCTIONAL STEP CHOCK

(71) Applicant: Red Rescue, LLC, Renton, WA (US)

(72) Inventor: Steve Randall, Renton, WA (US)

(73) Assignee: Red Rescue, LLC, Renton, WA (US)

( * ) Notice: Subject to any disclaimer, the term of this patent is extended or adjusted under 35 U.S.C. 154(b) by 155 days.

(21) Appl. No.: 15/942,422

(22) Filed: Mar. 30, 2018

(65) Prior Publication Data

US 2018/0224058 A1    Aug. 9, 2018

(51) Int. Cl.
```
F16M 11/22      (2006.01)
B66F 1/04       (2006.01)
B66F 13/00      (2006.01)
B66F 15/00      (2006.01)
```

(52) U.S. Cl.
CPC ............... *F16M 11/22* (2013.01); *B66F 1/04* (2013.01); *B66F 13/00* (2013.01); *B66F 15/00* (2013.01)

(58) Field of Classification Search
CPC .... B60T 3/00; B60P 3/077; B64F 1/16; B66F 1/04; B66F 13/00; B66F 15/00; F16M 11/22; F16M 2200/08; F16M 11/38; G10G 5/00; A62B 3/005; B62B 5/0083
USPC ............. 248/352, 558, 668; 188/32; 70/226; 211/198
See application file for complete search history.

(56) References Cited

U.S. PATENT DOCUMENTS

| | | | | |
|---|---|---|---|---|
| 1,267,741 A | * | 5/1918 | Buck | B66F 13/00 248/352 |
| 3,286,985 A | | 11/1966 | Eugene | |
| 3,289,794 A | * | 12/1966 | Miles | B60T 3/00 188/32 |
| 3,387,686 A | * | 6/1968 | Little | B64F 1/16 188/32 |
| 3,444,963 A | * | 5/1969 | Davis | B60T 3/00 188/32 |
| D215,325 S | * | 9/1969 | Merlo | D12/217 |
| 3,618,894 A | | 11/1971 | Meyer | |

(Continued)

FOREIGN PATENT DOCUMENTS

| | | |
|---|---|---|
| DE | 2629543 A1 | 1/1978 |
| DE | 102015214852 A1 | 2/2016 |

(Continued)

OTHER PUBLICATIONS

Extended European Search Report, dated Aug. 5, 2019, for European Application No. 19165097.7, filed Mar. 20, 2018, 11 pages.

*Primary Examiner* — Ingrid M Weinhold
(74) *Attorney, Agent, or Firm* — Cozen O'Connor

(57) ABSTRACT

A step chock for stabilizing a vehicle or other object against undesirable movement, such as, during a rescue operation. Embodiments for a step chock includes having two leg portions, one of which angularly rotates with respect to the second with a lever to lock the two leg portions at a specific angle. The step chock is usable in three positions including where the stair-stepped top surfaces of the two leg portions are forced under the vehicle, where the top surfaces of the two leg portions are against the ground and the bottom surfaces are forced under the vehicle, and where the rear surfaces of the two leg portions against the ground and the front surfaces of the two leg portions are forced under the vehicle. Further, the step chock is usable as a fulcrum for a lever and a lever adaptor to lift a vehicle.

18 Claims, 16 Drawing Sheets

(56) References Cited

U.S. PATENT DOCUMENTS

| | | | | |
|---|---|---|---|---|
| 3,664,466 A * | 5/1972 | Rotheiser | | B60T 3/00 |
| | | | | 188/32 |
| 3,800,917 A * | 4/1974 | Vick | | B60T 3/00 |
| | | | | 188/32 |
| 3,810,530 A * | 5/1974 | Jay | | B60T 3/00 |
| | | | | 188/32 |
| 3,843,147 A | 10/1974 | Fredricson | | |
| 3,904,158 A * | 9/1975 | Michael | | F16M 5/00 |
| | | | | 248/668 |
| 4,034,961 A * | 7/1977 | Breen | | B60S 11/00 |
| | | | | 254/94 |
| 4,140,206 A * | 2/1979 | Yamazaki | | B60T 3/00 |
| | | | | 188/32 |
| 4,186,823 A * | 2/1980 | White, Jr. | | B60T 3/00 |
| | | | | 188/32 |
| 4,388,037 A | 6/1983 | Suarez | | |
| 4,399,893 A * | 8/1983 | Switzer | | B60T 3/00 |
| | | | | 188/32 |
| 4,421,210 A * | 12/1983 | Sugino | | B60T 3/00 |
| | | | | 16/268 |
| 4,497,501 A | 2/1985 | Kedem | | |
| 4,501,444 A * | 2/1985 | Dominguez | | E05C 17/54 |
| | | | | 292/342 |
| 4,502,816 A * | 3/1985 | Creter, Jr. | | E02B 3/06 |
| | | | | 405/30 |
| 4,589,669 A | 5/1986 | Kedem | | |
| 4,594,048 A | 6/1986 | Sipla | | |
| 4,865,276 A * | 9/1989 | Hansen | | B64F 1/16 |
| | | | | 244/224 |
| 4,877,211 A * | 10/1989 | Orr | | B66F 7/243 |
| | | | | 248/352 |
| 4,955,873 A * | 9/1990 | Rajlevsky | | A61M 1/0001 |
| | | | | 128/DIG. 24 |
| 5,465,814 A * | 11/1995 | Ziaylek | | B60T 3/00 |
| | | | | 188/32 |
| 5,758,784 A * | 6/1998 | Chambers | | A62B 3/005 |
| | | | | 108/99 |
| 5,775,655 A * | 7/1998 | Schmeets | | A47B 5/00 |
| | | | | 108/115 |
| 5,876,011 A | 3/1999 | Blasing | | |
| 6,109,593 A | 8/2000 | Craychee | | |
| 6,135,420 A * | 10/2000 | Johnston | | B66F 7/243 |
| | | | | 254/88 |
| D436,465 S * | 1/2001 | Berkman | | D17/99 |
| 6,354,569 B1 * | 3/2002 | Gioia | | B66F 3/00 |
| | | | | 254/104 |
| 6,419,198 B1 * | 7/2002 | Einav | | A47B 91/005 |
| | | | | 248/346.03 |
| D482,904 S * | 12/2003 | Slaymaker | | D6/310 |
| 6,729,631 B2 * | 5/2004 | Trine | | B62B 3/008 |
| | | | | 280/47.11 |
| D531,106 S * | 10/2006 | Davidian | | D12/217 |
| 7,168,527 B2 * | 1/2007 | Bateman | | B60T 3/00 |
| | | | | 188/32 |
| 7,316,043 B2 * | 1/2008 | Henblad | | B60P 3/077 |
| | | | | 14/69.5 |
| 7,621,504 B2 | 11/2009 | McCallum | | |
| 7,681,847 B2 * | 3/2010 | Levin | | A47B 9/18 |
| | | | | 248/188.2 |
| 7,784,751 B1 * | 8/2010 | Bellows | | A47B 91/02 |
| | | | | 248/188.2 |
| D646,614 S * | 10/2011 | Brockington | | D12/217 |
| D656,882 S * | 4/2012 | Beranek | | D12/217 |
| 8,146,870 B1 * | 4/2012 | Cooper | | G10G 5/00 |
| | | | | 248/150 |
| D662,026 S * | 6/2012 | Beranek | | D12/217 |
| 8,251,349 B2 | 8/2012 | Drake | | |
| 8,672,298 B2 | 3/2014 | Hsieh | | |
| 8,814,142 B2 | 8/2014 | Pasto et al. | | |
| D778,373 S * | 2/2017 | Gossett | | D21/685 |
| 9,637,094 B2 * | 5/2017 | Galletti | | B60T 3/00 |
| 9,784,453 B2 * | 10/2017 | Hall | | F24C 3/14 |
| 9,938,125 B2 | 4/2018 | Randall | | |
| 2005/0263670 A1 | 12/2005 | Pasto | | |
| 2006/0056944 A1 * | 3/2006 | Henblad | | B60P 3/077 |
| | | | | 414/401 |
| 2006/0125196 A1 | 6/2006 | Hartmann et al. | | |
| 2013/0087749 A1 | 4/2013 | Hsieh | | |
| 2016/0039394 A1 * | 2/2016 | Galletti | | B60T 3/00 |
| | | | | 224/567 |
| 2017/0008498 A1 * | 1/2017 | Metz | | B60T 3/00 |
| 2017/0043751 A1 | 2/2017 | Saltzman et al. | | |
| 2017/0253470 A1 | 9/2017 | Jones | | |
| 2018/0178764 A1 * | 6/2018 | Hu | | B60T 3/00 |

FOREIGN PATENT DOCUMENTS

| | | | |
|---|---|---|---|
| EP | 2957470 A1 | 12/2015 | |
| ES | 2387162 A1 | 9/2012 | |
| GB | 2326394 A | 12/1998 | |
| KR | 101365513 B1 | 3/2014 | |
| WO | WO-9513496 A1 * | 5/1995 | F16M 13/00 |

* cited by examiner

MULTI-FUNCTIONAL STEP CHOCK

FIELD OF DISCLOSURE

The field of disclosure is generally directed to a step chock apparatus. More particularly, the invention is directed to a step chock apparatus that may be used to assist in the stabilizing of vehicles for reasons such as to facilitate access to occupants by rescue workers, whereby the occupants are trapped inside the vehicle or accident victims are trapped underneath the vehicle.

BACKGROUND

Following an accident, it is important to stabilize the vehicles and create a work area that is safe for first responders who attempt to assist any victims or trapped parties within or underneath the vehicles. This is because of various changing conditions including vehicle sliding, rolling, falling, or the driver regaining consciousness and naturally trying operate the vehicle's controls, which could lead to vehicle instability. Elements such as ground effects, low ground clearance, and larger wheels make the initial stabilization of these types of vehicles a very challenging endeavor. Most popular methods of stabilizing the vehicle currently are step chocks, cribbing, or using other cars by marrying two or more vehicles together. However, there are many disadvantages and difficulties with the existing options for stabilizing a vehicle. Additionally, using other multiple vehicles does have its benefits, but is not always practical.

Cribbing involves stacking multiple elongated pieces of wood laid on the road or ground and crossed until they are assembled against the underside of the car or other load. Sometimes a rescuer or first responder will use a mallet or other similar device to hammer in the cribbing to fill the space between the cribbing and the vehicle. Placing cribbing to properly stabilize a vehicle can be a dangerous and time-consuming process where if one wooden block is not properly in place the whole system will fail and the vehicle will not properly be stabilized. The nature of cribbing is to create a structure that will resist a collapse with multiple independent like components that are held in place by gravity, unfastened to each other.

This system requires the load to collapse in an perpendicular direction for the cribbing to be maintain stability and continue to support load. In the case of high clearance vehicles, such as for example, SUV's, trucks, and buses, the cribbing needs to be stacked with many levels to span the distance between the ground and the vehicle. The higher the stacked cribbing is, the more the cribbing is prone to failure due to additional slip surfaces present with each piece of stacked cribbing. Further, contamination at the scene with various leaking vehicle fluids increases the danger of the cribbing failing and unwanted vehicle movement. The time spent placing cribbing also is time that could be used to save the trapped victim.

Step chocks are another type of stabilizing tool that supports the vehicle underneath the body and are useful for vehicles of different heights. This may be accomplished by one firefighter positioning him or herself with their back to the vehicle and lifting at the top of the wheel well. Then another firefighter may place the step chock under the rocker panel of the vehicle to take weight off of the wheels. If more weight needs to be taken off, the tires can then be flattened to take all the weight off of the wheels and further flattened so as to place all the weight of the vehicle on the step chocks.

The step chock also provides a tool to transmit a pushing force to the ground by filling the void between the vehicle or other object and ground. Typically, when first responders want to stabilize a vehicle, four step chocks are placed underneath the vehicle at the front and the rear of the passenger compartment under the rocker panels on both sides of the vehicle. Presently, step chocks are solid and non-articulating, and can only be used only in two positions to secure a vehicle. Currently available models for step chocks can only be used with the top surface having elevated steps facing up or down. These step chocks also will only secure heights of one (1) inch to eleven (11) inches. There are other step chocks currently available that can be adjusted, but only operate with one orientation at multiple heights to secure the vehicle.

Thus there still exists a great need for an improved process and system for stabilizing a vehicle, particularly for first responders or rescuers to assist any trapped individuals who may need to be rescued and to protect the first responders or rescuers from the vehicles falling.

SUMMARY

In one aspect, embodiments in the present description are directed to a step chock for stabilizing a vehicle or other object including a first leg and a second leg, the first leg and the second leg having a top surface, the top surface having a series of steps at different elevations, a bottom surface, and a rear surface, whereby when the first leg and second leg are at an angle in relation to one another, the step chock provides three configurations to stabilize the vehicle or other object by preventing movement of a proximate part of the vehicle or other object. Further, embodiments in the present description are directed to a first configuration whereby the bottom surfaces of the first leg and second leg are in contact with the ground and the top surfaces of the first leg and second leg provide a continuously angled support engagement shelf for engagement with a part of the vehicle or other object, a second configuration whereby the top surfaces of the first leg and second leg are in contact with the ground and the bottom surfaces of the first leg and second leg provide a support engagement shelf for engagement with a part of the vehicle or other object, a third configuration whereby the rear surfaces of the first leg and second leg are in contact with the ground and the front surfaces of the first and second leg are placed underneath a part of the vehicle or other object.

In one aspect, embodiments in the present description are directed to a method of using a first step chock when stabilizing a vehicle or other object, the method including: positioning a step chock underneath a vehicle or other object proximate to a wheel or other part of the vehicle or other object to prevent movement, the step chock comprising a first leg and a second leg, the first leg and the second leg having a top surface, the top surface having series of steps at different elevations, a bottom surface, and a rear surface, releasing a position-locking pin from a first holding member fixed to the second leg, the position-locking pin securing a swivel link to the first holding member in place to a first position, the position-locking pin securing the first leg and second leg in a parallel alignment, moving the first leg at an angle relative to the second leg wherein the first leg and the second leg are connected by one or more hinges, the one or more hinges permitting rotational movement of the first leg relative to the second leg, rotating the swivel link from the first position to a second position, the swivel link in the second position being axially aligned with a second holding member fixed to the second leg, inserting a position-locking pin into the second holding member fixed to the second leg, the position-locking pin securing the swivel link in the second position to the second holding member, the position-locking pin securing the first leg and second leg at an angle, and if need be placing a second step chock in opposing relation underneath the vehicle or other object to the first step chock.

In one aspect, embodiments in the present description are directed to a method for stabilizing a vehicle or other object including the steps of: coupling a lever adapter device to a lever, the lever coupling to and balancing on a fulcrum, the fulcrum fastened to a step chock, the step chock comprising a first leg and a second leg, the first leg and the second leg having a top surface, the top surface having series of steps at different elevations, a bottom surface, front surface, and rear surface, whereby when the first leg and second leg are at an angle in relation to one another; sliding the lever adapter device beneath the vehicle or other object; applying force to an end of the lever causing the lever adapter device to raise the vehicle or other object such that the lever adapter device make contact with an underside of the vehicle or other object; raising the vehicle or other object to the desired height, supporting the underside of the vehicle or the other object with a top surface of the lever adaptor device; positioning one or more step chocks under the vehicle or other object; and then lowering the vehicle or other object onto the step chocks, withdrawing the lever and the lever adapter device by pulling the body of the lever backwards and away from the vehicle or other object. The step chocks also versatile enough to be used in conjunction with any lifting device to secure the vehicle in a raised position.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

Figure 1:
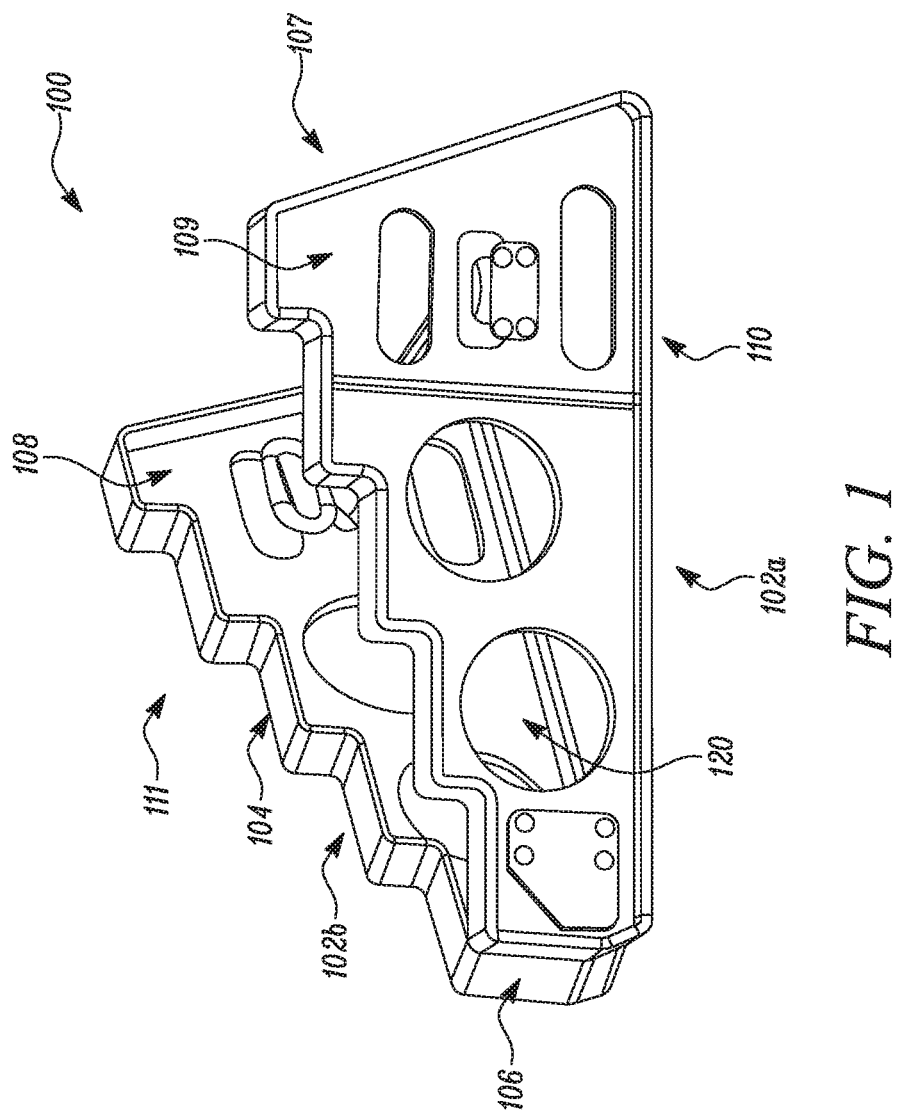
FIG. 1 shows a perspective left side view of the step chock open in the "Step up" configuration.

In the Summary above and in this Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined).

"Exemplary" is used herein to mean "serving as an example, instance, or illustration." Any aspect described in this document as "exemplary" is not necessarily to be construed as preferred or advantageous over other aspects Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any item, so a "set of items," may indicate the presence of only one item, or may indicate more items. Thus, the term "set" may be equivalent to "one or more" as used herein.

In the following description, numerous specific details are set forth in order to provide a more thorough understanding of the one or more embodiments described herein. However, it will be apparent to one of ordinary skill in the art that the invention may be practiced without these specific details. In other instances, well-known features have not been described in detail to avoid unnecessarily complicating the description.

The present disclosure recognizes the unsolved need for an apparatus and method that may be used to rapidly and safely stabilize a vehicle or other object, particularly during emergency rescue operations where rescue workers need to secure the vehicle with the use of step chocks underneath an unstable or impaired vehicle or to safely remove occupants from within or under the vehicle. Existing methods and techniques are not as versatile usually providing only one configuration suitable for a limited range of elevations or contact points to interface with the vehicle. Other existing methods require anywhere from five to ten minutes to implement and if one component of the structure is not properly installed the entire step chock may fail leading to injury or death.

The present description includes embodiments for a step chock apparatus that provides a number of benefits and advantages not found in conventional methods for stabilizing a vehicle or other object. The step chock is structured whereby when the step chock is placed in an opened position the step chock may be orientated to operate in three different configurations whereby the step chock may provide stabilization of a vehicle or other object that the step chock is in contact with. The three different configurations are described from now on as "Step up", Wedge up", and "Toe up" for identifying purposes.

FIG. 1 depicts the "Step up" configuration. In the "Step up" configuration step chock 100 is oriented in the open position whereby the bottom surface such as bottom surface 110 is in contact with the ground or another surface step chock 100 may lay parallel against. The top surface such as top surface 111 comprises a series of steps such as steps 104 at different elevations whereby each step 104 provides a support shelf for engagement with a part of a vehicle to be stabilized and since the steps are at different elevation points step chock 100 provides various contact points between step chock 100 and the underside or other parts of the vehicle. The specific step may be chosen as the contact point between the vehicle based on the specific dimensions of the vehicle such as the distance between the ground and the underside of the body of the vehicle as well as the best location and elevation the vehicle may be stabilized by step chock 100. In the preferred embodiment step chock 100 is fourteen (14) inches from bottom surface 110 to the step of highest elevation of top surface 111.

Figure 2:
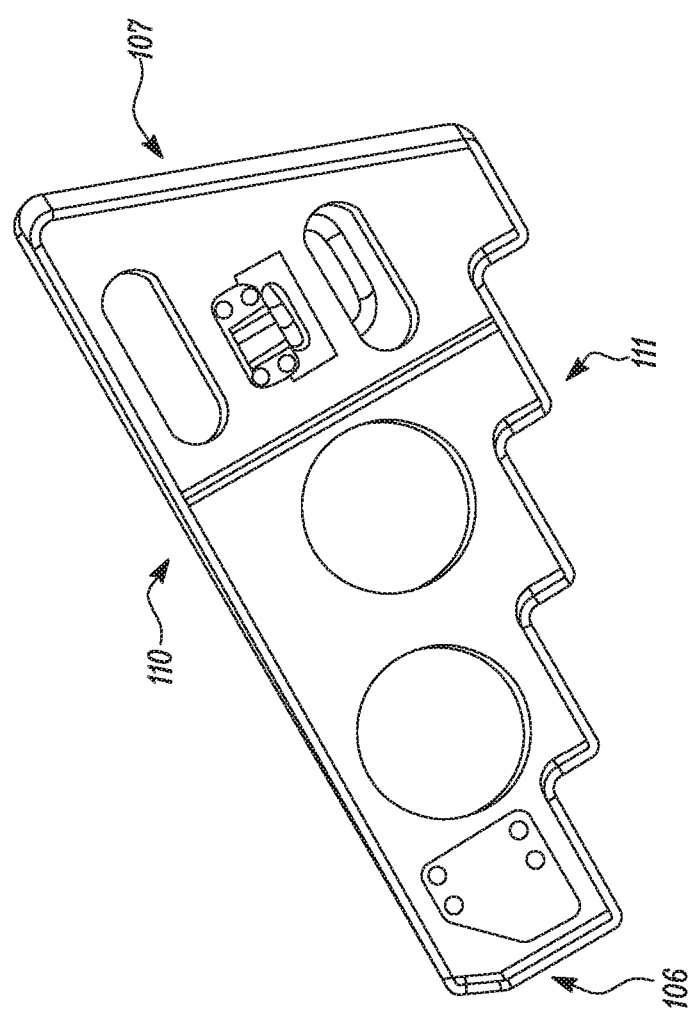
FIG. 2 shows a right side view of the step chock open in the "Wedge up" configuration.

The "Wedge up" configuration is depicted in FIG. 2. In the "Wedge up" configuration step chock 100 is oriented in the open position with top surface 111 having steps 104 at different elevations is in contact with the ground whereby bottom surface 110 is angled to the ground and interfaces with the underside or other parts of the vehicle to be stabilized. The now angled bottom surface 110 provides a support for engagement with the underside or other part of the vehicle to be stabilized. With bottom surface 110 at an angle step chock 100 provides various contact points on bottom surface 110 between step chock 100 and parts of the vehicle. In the preferred embodiment step chock 100 is fourteen (14) inches from top surface 111 to the highest point on bottom surface 110.

Figure 3:
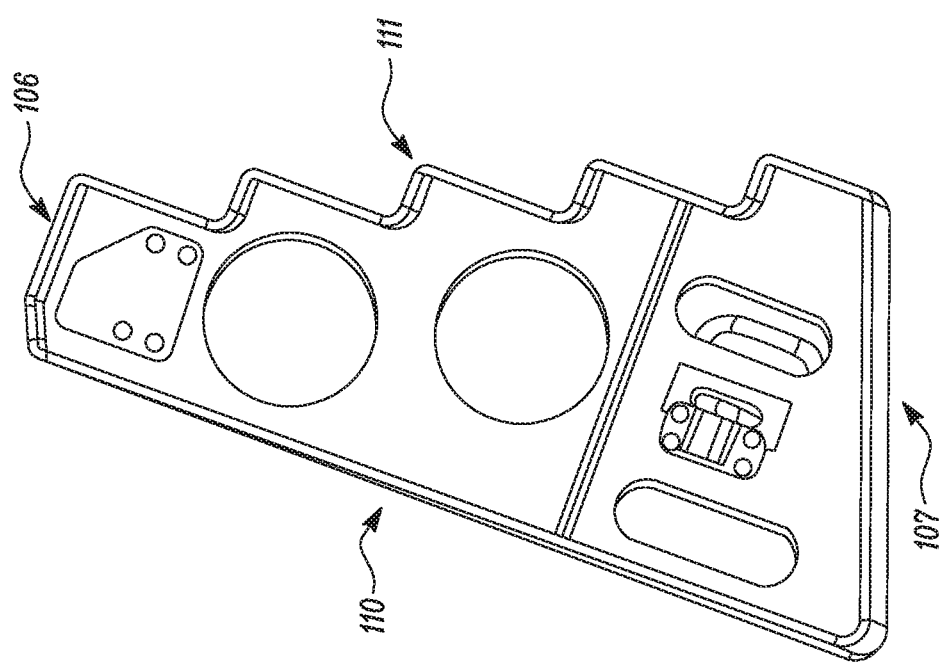
FIG. 3 shows a left side view of the step chock open in the "Toe up" configuration.

The "Toe up" configuration also provides the ability to have one or more step chocks 100 positioned underneath the vehicle to be stabilized and are used as jack stands. Jack stands are important tools that keep a vehicle propped up after having used a floor jack, like a scissor jack or a hydraulic jack, to lift a vehicle. The "Toe up" configuration is depicted in FIG. 3. In the "Toe up" configuration step chock 100 is orientated in the open position with the rear surface such as rear surface 107 in contact with the ground whereby entire step chock 100 is positioned under the vehicle where the front surface such as front surface 106 is in contact with the vehicle to be stabilized. Front surface 106 may be designed to be used at two different angles in the "Toe up" configuration, one angle for a vehicle being raised and supported with the opposite side still on the ground and another angle for when a vehicle is lifted and supported on both sides of the vehicle. This enables step chock 100 to have enough foot print in most circumstances to resist any remaining lateral force of the jack adapter didn't offset with the curved top bend. In the preferred embodiment step chock 100 is twenty (20) inches from rear surface 107 to front surface 106 in contact with the vehicle. In one of the "Toe up" configurations step chock 100 may also operate as a fulcrum for a lever adaptor device utilized in the initial lifting a vehicle whereby the lever adaptor device is fastened to the top of step chock 100, which will be further be described later in the description.

Step chock 100 is designed whereby in the "Step up", Wedge up", and "Toe up" configurations there is a minimum survivable space of fourteen (14) inches, which provides enough space for the rescue workers to operate under the vehicle as well as escape if, need be. When a car moves the step chock or the step chock is impacted in a way that the step chock topples over while in the "Toe up" configuration the step chock will fall back into another of the configurations which still provides sufficient space for rescue workers under a vehicle for the loading, treating or disentangling a patient as well as processes that require navigating underneath the vehicle.

Further, it is noted that while the step chock is particularly useful and beneficial for firefighters and other first responders during emergency rescue operations, the step chock may be used by any individual in a variety of situations, and is not limited to the use for emergency rescue operations. It is foreseeable that the step chock may be used anytime to stabilize or steady, trees, poles, walls, equipment, furniture, etc. Additional details regarding one or more embodiments of a step chock as discovered and described in the present description are provided below.

Step chock 100 includes a left leg and right leg such as left leg 102a and right leg 102b. Left leg 102a and right leg 102b are of elongated shape having a length greater than the width with a preferred height no longer than 1.5 times the width. This ratio is a non-limiting example and the length may be of any multiple to the width to accommodate specifically tailored situations such as managing the step chock for operation with abnormally shaped vehicles or objects. Left leg 102a and right leg 102b are preferably made out of 6061 aluminum or wood but also may be of any material suitable for the stabilization of a vehicle such as fiber, metal, polycarbonate, a combination of these materials, or any material suitable for step chocks to stabilize a load that is known by those of skilled in the art. Left leg 102a and right leg 102b each has an inner surface such as inner surface 108 and an outer surface such as outer surface 109.

Left leg 102a and right leg 102b have a series of holes such as holes 120 created to lighten the weight of step chock 100 without lessening the structural integrity. The figures show the holes are circular and oval in shape but this is for illustrative purposes only and the holes are not limited to this shape and may be of any variety of curvature and sides, including a triangle, square, trapezoid, hexagon, or octagon. Inner surface 108 and outer surface 109 of left leg 102a and right leg 102b may include a midsection that is recessed relative to the sidewalls whereby the recession is of size to contain and protect the components of step chock 100 therefore only the sidewalls interact when left leg 102a and right leg 102b are in contact with each other as well as when left leg 102a or right leg 102b are placed on a flat surfaces or up against another step chock or other object.

Top surface 111 may be stair step in shape with steps such as steps 104. Steps 104 having a riser and tread component, increasing in elevation in the direction of front surface 106 towards rear surface 107. Surfaces may be textured or have a gripping surface material as well as any adhesive whereby the material prevents slippage between surfaces and the undercarriage or other parts of the vehicle that the step chock comes in contact with. The coverage area of the material may be an externally applied adhesive coating or the material may be impregnated within surface itself. In some embodiments the surfaces may have a machined smooth, textured surface or be manufactured to have receptacles or other apertures to receive replaceable studs, teeth or assemblies to improve gripping surface. In some embodiments surfaces may also receive an adhesive coating or substance.

Steps 104 may be of shape whereby when step chock 100 is in a closed position the corresponding steps of left leg 102a and right leg 102b create a plurality of chevron designs and in the opened position the risers of each steps 104 are parallel to a vehicle perpendicular to the vertex of the angle formed by left 102a and right leg 102b. In some embodiments steps 104 may be square to each other creating a straight line when closed. This design of steps 104 provides a more positive contact side of the load. While only five steps 104 are shown on top surface 111 of the left leg 102a and right leg 102b, more or less may be used. Front surface 106, rear surface 107, and bottom surface 110 may also have textured or gripping surface material, adhesive, or rubber pads to prevent slippage when stabilizing the vehicle.

Figure 4:
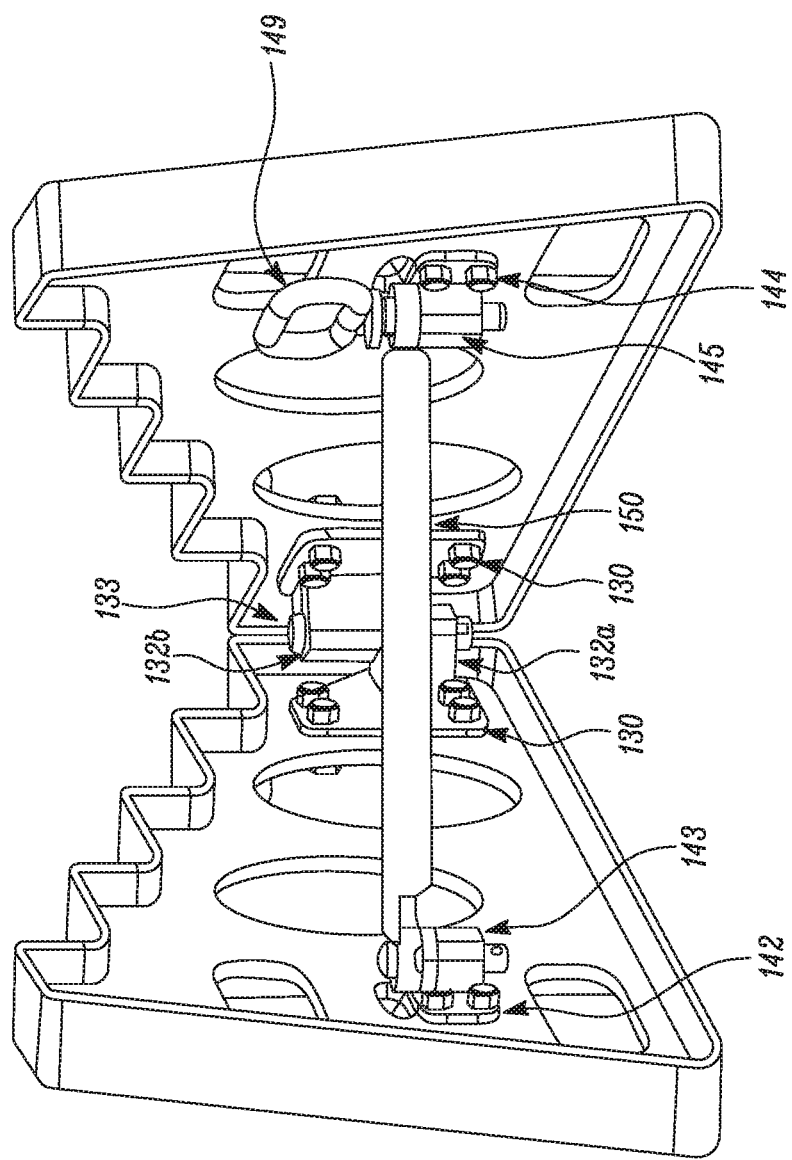
FIG. 4 shows a rear view of the step chock open in the "Step up" configuration.

Step chock 100 is comprised of backing plates such as backing plates 130 on inner surface 108 and outer surface 109 near front surface 106 of left leg 102a and right leg 102b to reduce the possibility of tear out, as depicted in FIG. 4. While backing plates 130 are shown in FIG. 4, those skilled in the art may appreciate that additional backing plates may also be used in other non-limiting embodiments backing plates 130 may have apertures or openings for receiving fasteners to secure the plates to the left leg and right leg. The fasteners may be any type of fasteners known in the art, including, but not limited to, any type of screw and/or nut and bolt combination. A first leaf such as leaf 132a having an opening passageway is attached to the surface of the backing plate fastened to inner surface 108 of left leg 102a. A second leaf such as second leaf 132b having an opening passageway is attached to the surface of backing plate 130 fastened to inner surface 108 of right leg 102b. The first leaf 132a and second leaf 132b are located at different elevations whereby the leaves are arranged having the first and second leaf's 132a and 132b passageways coaxially aligned.

A pin such as pin 133 may be placed through the opening passageways of first leaf 132a and second leaf 132b and then secured in place, forming a hinge, whereby the hinge permits rotational movement of left leg 102a or right leg 102b relative to the other leg. Pin 133, first leaf 132a, and second leaf 132b may be designed so that rotational movement may be stopped after reaching a specific angle. The number of leaves, pin, and hinges are non-limiting and may be amount to provide sufficient support and that do not deviate from the intention of the step chock. In other embodiments a hinge may be used to couple the right leg and left leg with the hinge having two leaves fastened to the front surface of the right leg and left leg. Along the center axis of the hinge, the leaves have protrusions located at different elevations forming an opening passageway whereby a pin may be placed through the opening passageway and then secured in place. In further embodiments there may be more than one hinges connecting the left leg and right leg.

Figure 5:
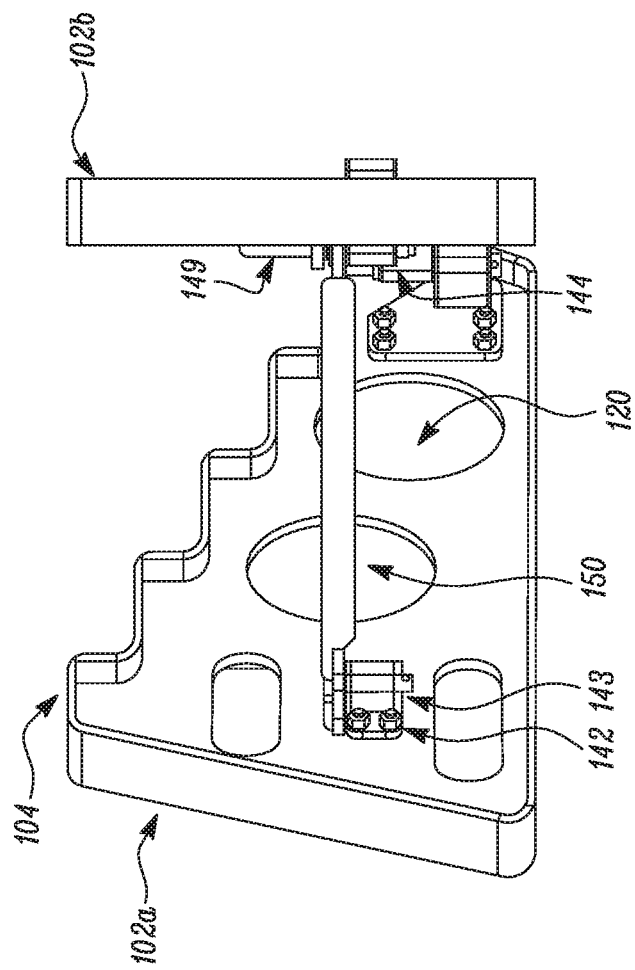
FIG. 5 shows a perspective rear view of the step chock open in the "Step up" configuration.

Step chock 100 includes a locking mechanism comprised of plates such as plates 142 and 144 on the inner surface 108 of left leg 102a and right leg 102b respectively, and a plate such as plate 146 on outer surface 109, near rear surface 107, of left leg 102a and right leg 102b having apertures or openings for receiving fasteners to secure plates 142, 144, and 146, as depicted in FIGS. 4 and 5. A holding member such as holding member 143 having an opening passageway is attached to the surface of backing plate 142 fastened to inner surface 108 of left leg 102a. A holding member, such as holding member 145, having an opening passageway is attached to the surface of backing plate 144 fastened to inner surface 108 of right leg 102b. A holding member, such as holding member 147, having an opening passageway is attached to the surface of backing plate 146 fastened to outer surface 109 of the right leg 102b.

Figure 6:
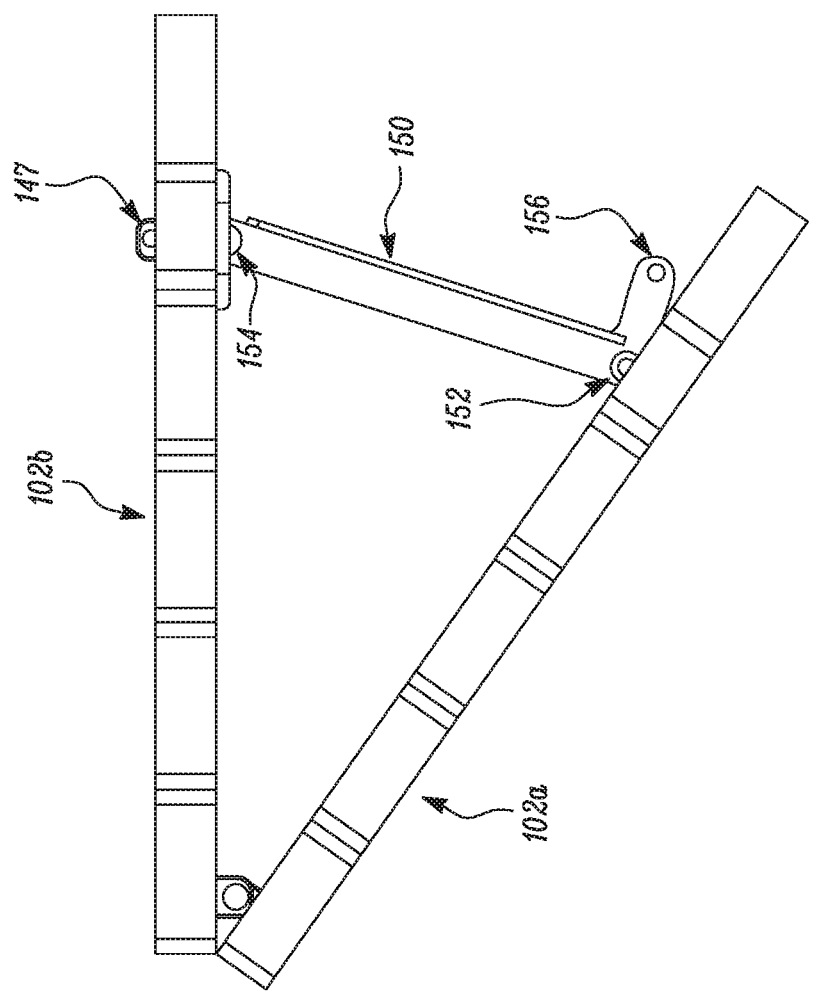
FIG. 6 shows a top view of the step chock open in the "Step up" configuration.
Figure 7:
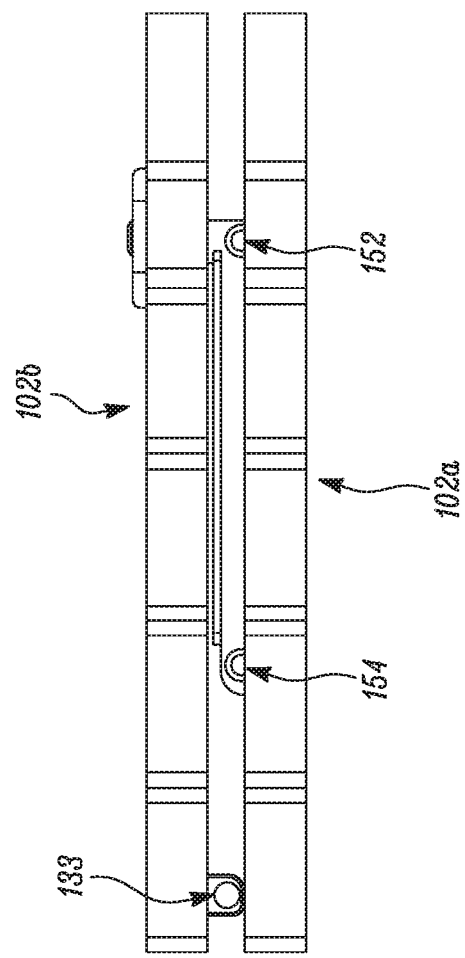
FIG. 7 shows a top view of the step chock closed in the "Step up" configuration.

As can be best seen in FIGS. 6 and 7 the locking mechanism includes an elongated L-shaped arm such as L-shaped arm 150 preferably made of steel but other materials such as iron, bronze, copper, plastics, or other composites may be used. L-shaped arm 150 includes a longer vertical portion and a shorter horizontal portion joined integrally to the longer portion to form the shape of an "L". L-shaped arm 150 is provided with a pivot hole such as pivot hole 152 at the corner of the vertical portion and horizontal portion as well as a first retainer hole such as first retainer hole 154 at the end of the vertical portion and a second retainer hole such as second retainer hole 156 at the end of the horizontal portion. Pivot hole 152 is coaxially aligned with the opening passageway of holding member 143 located on inner surface 108 of the left leg 102a. A fastener is placed through pivot hole 152 and the opening passageway of the holding member producing a pivot point for L-shaped arm 150.

The pivot point allows L-shaped arm 150 to swing or rotate within step chock 100 between a first position corresponding to where step chock 100 is in an open position and a second position corresponding to where step chock 100 is in a closed position. In the open position retainer hole 154 on the vertical portion of L-shaped arm 150 is coaxially aligned with the opening passageway of the holding member 145 on inner surface 108 of right leg 102b whereby a position-locking pin such as position-locking pin 149 may be placed through retainer hole 154 and holding member 145 on inner surface 108 of right leg 102b and be secured in place thus maintaining step chock 100 in an open position.

When step chock 100 is in an open position left leg 102a and right leg 102b are maintained at a distance with a specific angle between them. This specific angle may be 35 degrees; however this is non-limiting and may be of any degrees separation from 0 degrees to 360 degrees.

Figure 8:
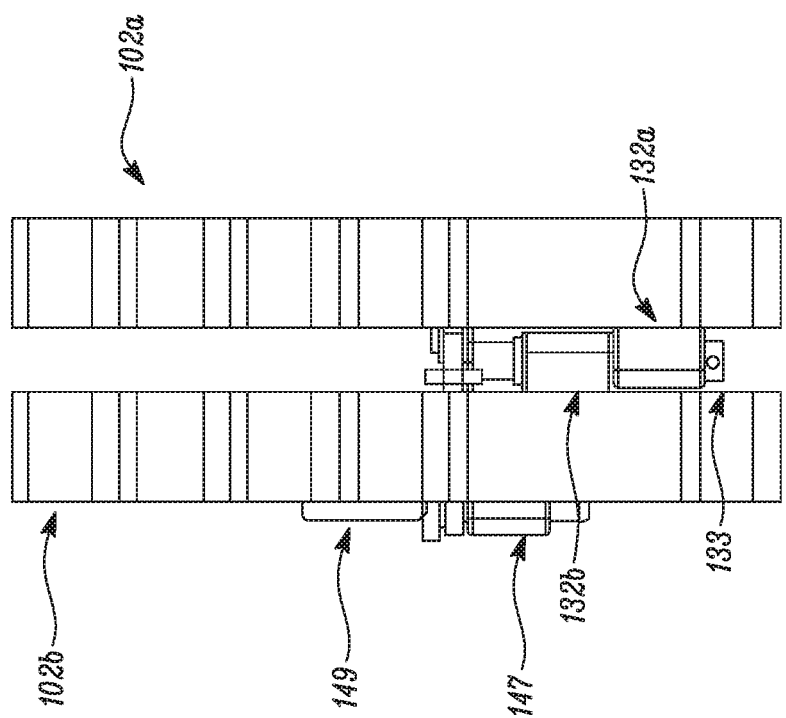
FIG. 8 shows a front view of the step chock closed in the "Step up" configuration.
Figure 9:
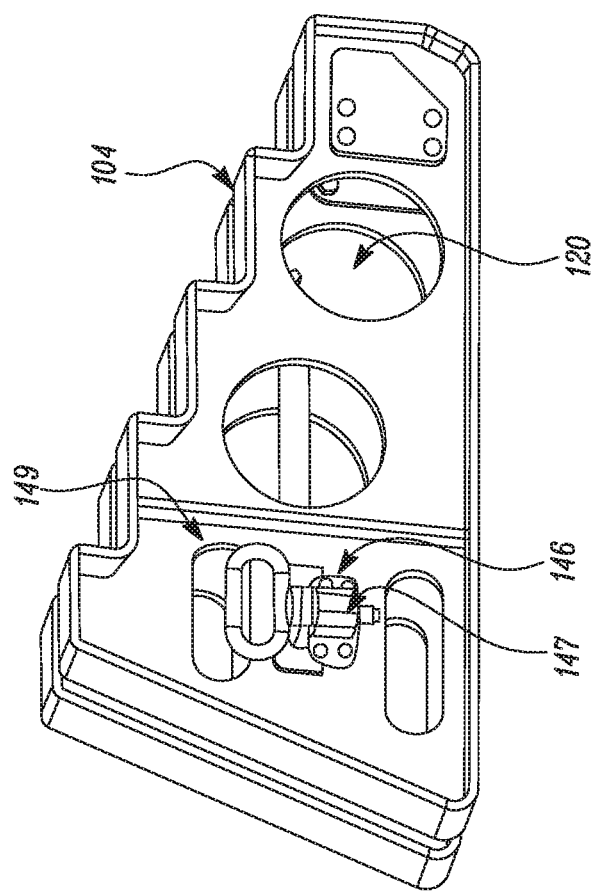
FIG. 9 shows a perspective right side view of the step chock closed in the "Step up" configuration.
Figure 10:
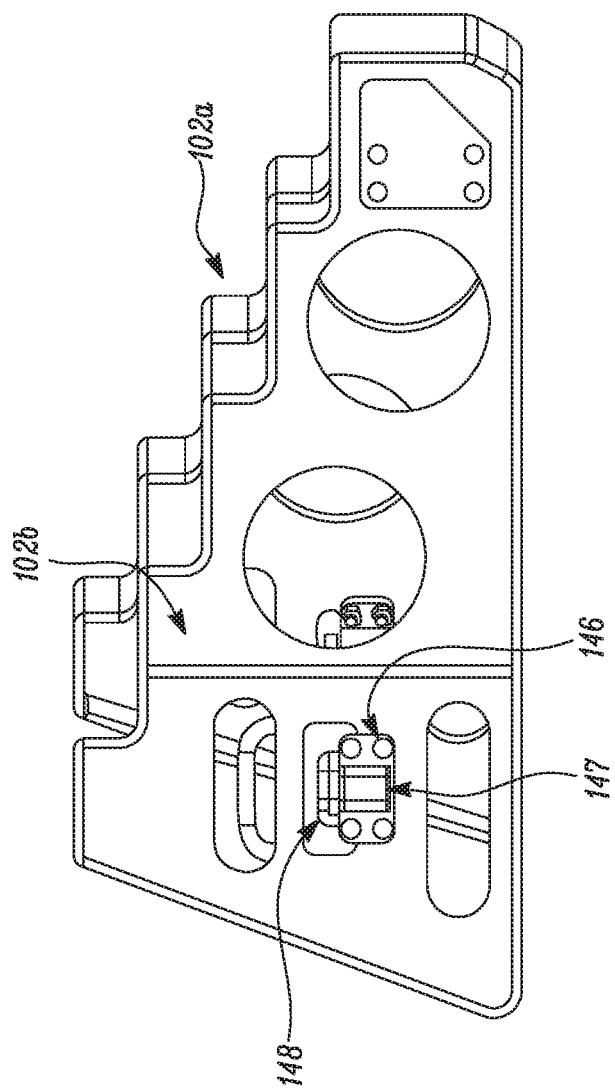
FIG. 10 shows a perspective right side view of the step chock open in the "Step up" configuration.

In the closed position retainer hole 156 on the horizontal portion of L-shaped arm 150 is coaxially aligned with the opening passageway of holding member 147 whereby the position-locking pin may be placed through retainer hole 156 and holding member 147 on outer surface 109 of right leg 102b and be secured in place thus maintaining step chock 100 in a closed position, as depicted in FIG. 8. A hole such as hole 148 passes through inner surface 108 and outer surface 109 of right arm 102b whereby hole 148 is of a size and location so that the horizontal portion of L-shaped arm 150 may pass through inner surface 108 and outer surface 109 of right leg 102b to be coaxially aligned with holding member 147 attached to backing plate 146 on outer surface 109 of right leg 102b. When step chock 100 is in a closed position left leg 102a and right leg 102b are maintained at a close proximity in a parallel configuration. In further embodiments the L-shaped arm may be reversed and fastened to a hole on the inner surface of the right leg whereby the L-shaped arm may be fastened with the position-locking pin to a holding member on the inner surface of the left leg to lock the step chock in an open position and to a holding member on the outer surface of the left leg to lock the step chock in a closed position.

The figures only show one illustrative example and the number of holding members, hinges, pivot points to lock the step chock at a closed position or open position are non-limiting. In further embodiments there may be multiple L-shaped arms or the L-shaped arm may be replaced by a different apparatus or shape such as a "T" or "F" and may have multiple holes or holes in different locations whereby the L-shaped arm can be locked in a multitude of positions whereby the step chock may be locked in an open position at a different angle than the one illustrated. In some non-limiting embodiments, the step chock may have one or more bars, rods, or other structures connecting from one surface to another to create a crush resistant addition if a load such as a vehicle or other object was knocked out of the "Toe up" configuration so that the step chock may provide a survivable space for a First Responder or other user.

In order to move step chock 100 from the closed position to the open position, an operator removes the position-locking pin from retainer hole 156 on the horizontal portion of L-shaped arm 150 and holding member 147 positioned on backing plate 146 of outer surface 109 of right leg 102b. The operator would then angularly rotate left leg 102a from right leg 102b and swing L-shaped arm 150 in clockwise direction around the pivot point so as to cause retainer hole 154 on the vertical portion of L-shaped arm 150 to slide over to holding member 145 located on backing plate 144 inner surface 108 of right leg 102b. The position-locking pin is then placed through retainer hole 154 on vertical portion of L-shaped arm 150 and holding member 145 thus locking step chock 100 in an open position. Once step chock 100 is locked in the open position step chock 100 may be orientated in the "Step up", Wedge up", and "Toe up" configurations.

Figure 11:
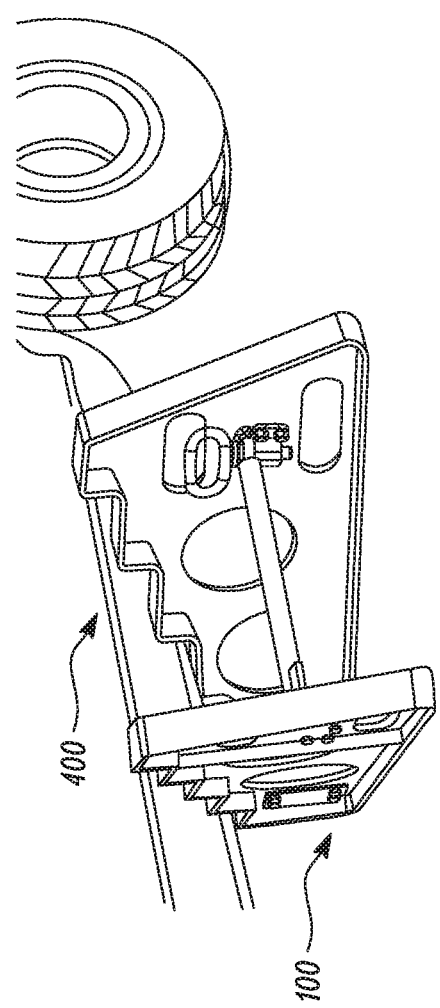
FIG. 11 shows a perspective view of the step chock open in the "Step up" configuration being used as a support shelf underneath a vehicle.
Figure 12:
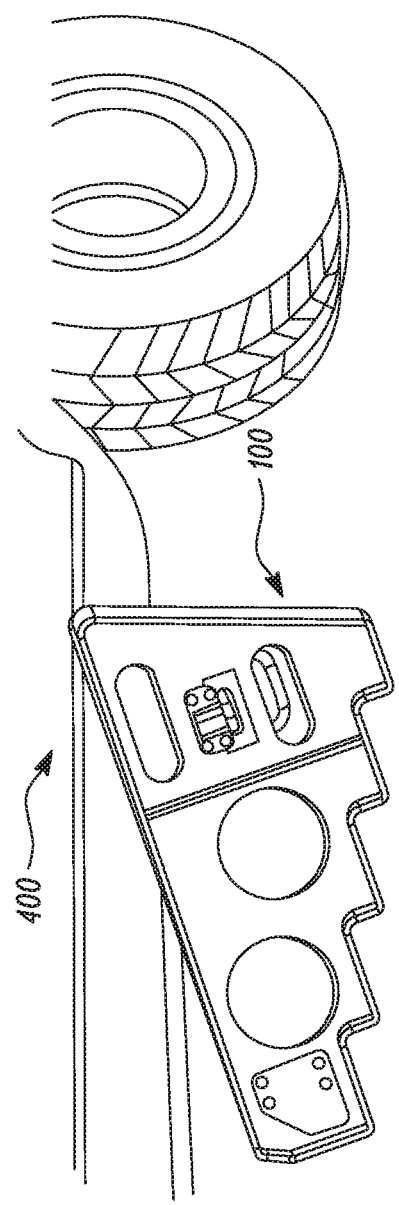
FIG. 12 shows a perspective view of the step chock open in the "Wedge up" configuration being used as a support shelf underneath a vehicle.
Figure 13:
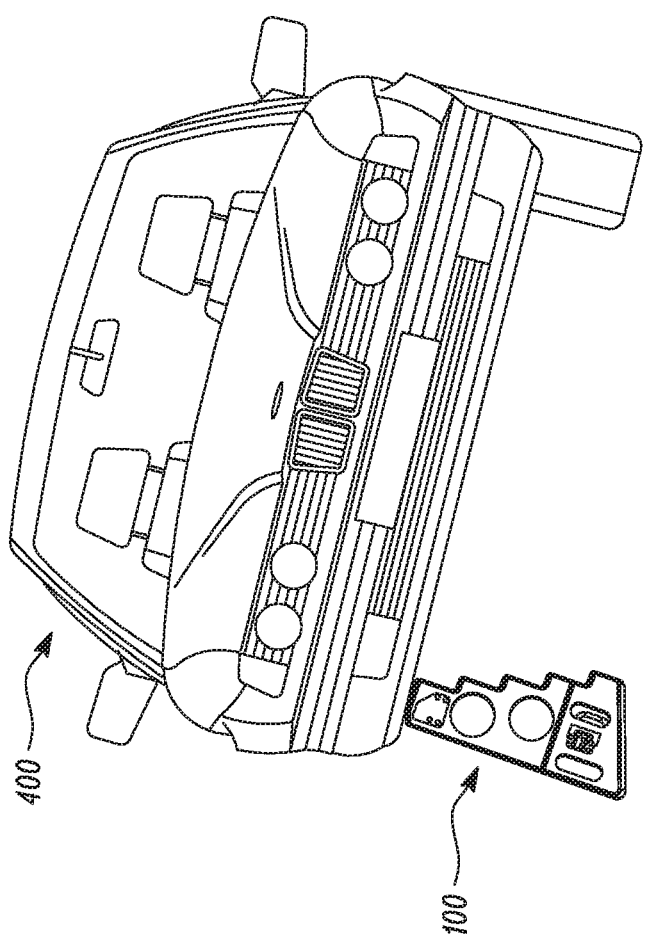
FIG. 13 shows a front view of the step chock open in the "Toe up" configuration being used as a support shelf underneath a vehicle.
Figure 14:
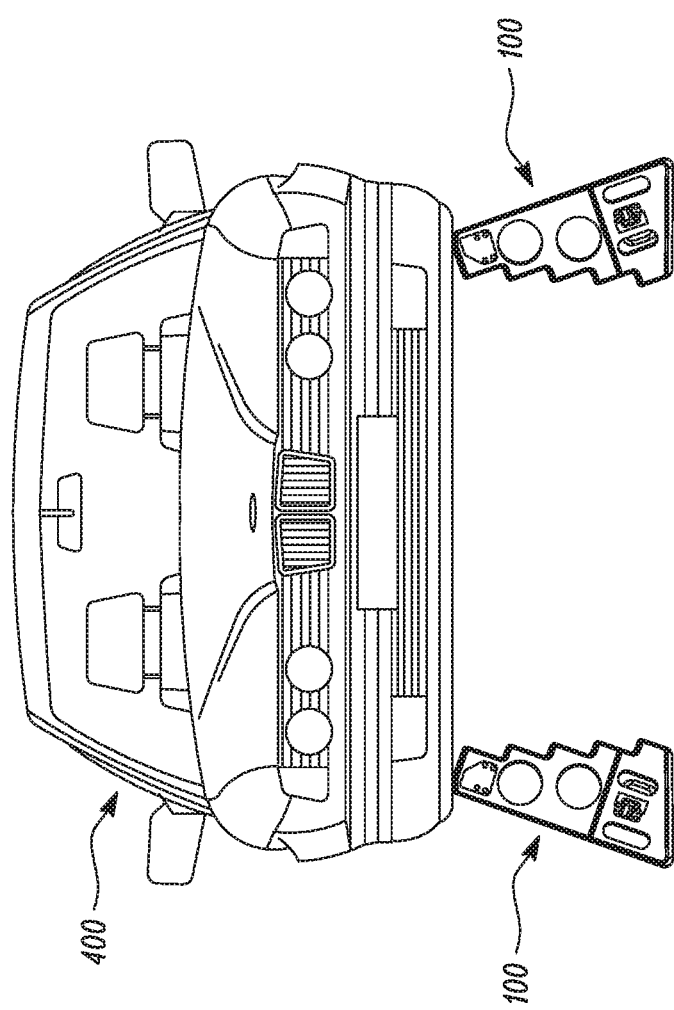
FIG. 14 shows a front view of step chocks open in the "Toe up" configuration to support both sides of the vehicle.

In the "Step up" configuration, bottom surface 110 is in contact with the ground and top surface 111 is used a support shelf for engagement with a part of a vehicle such as vehicle 400 as shown in FIG. 11. In the "Wedge up" configuration, top surface 111 is in contact with the ground and bottom surface 110 is used a support shelf for engagement with a part of vehicle 400 as shown in FIG. 12. In the "Toe up" configuration, rear surface 107 is in contact with the ground and bottom surface 110 is used a support shelf for engagement with a part of vehicle 400 as shown in FIGS. 13 and 14. In FIG. 13 a first angle on front surface 106 is used to provide support for vehicle 400 being raised and supported with the opposite side still on the ground. In FIG. 13 a second angle on front surface 106 is used for when vehicle 400 is lifted and supported on both sides of the vehicle.

To position step chock 100, a first operator stations themselves with their back to the vehicle and lifts at the top of a wheel well while a second operator then places step chock 100 under the vehicle preferably at the frame rails, rocker panel, or any other parts proximate to the wheel of the vehicle to take weight off of the wheel and prevent the wheel from rotating. If more weight needs to be taken off, the tires can then be flattened by releasing air from the tire by ordinary means known by those skilled in the art to place all the weight of the vehicle on step chocks 100. The first and second operator may provide additional stabilization to the vehicle by using four (4) step chocks 100 at front and rear of passenger compartment under the frame rail or rocker panels on both sides of the vehicle.

Figure 15:
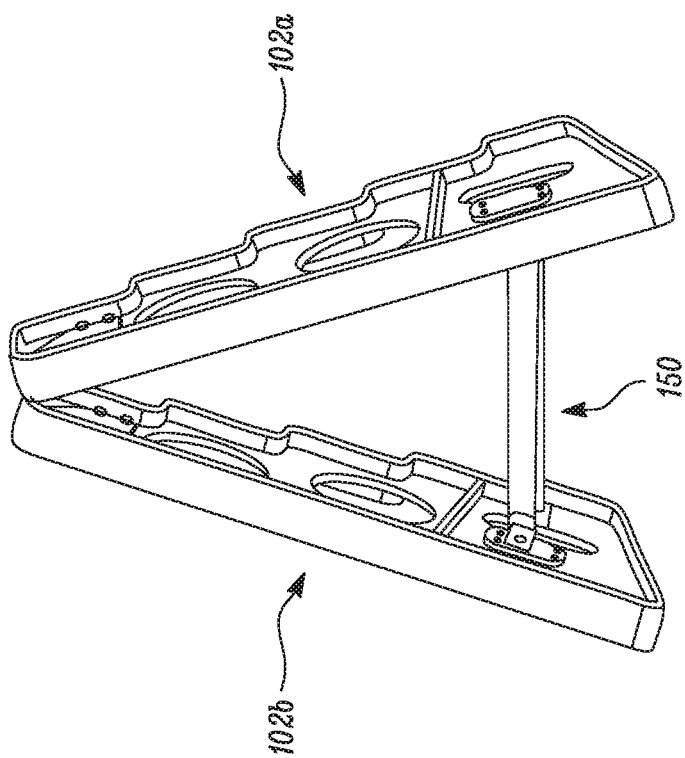
FIG. 15 shows a perspective front view of the step chock open in the "Toe up" configuration.
Figure 16:
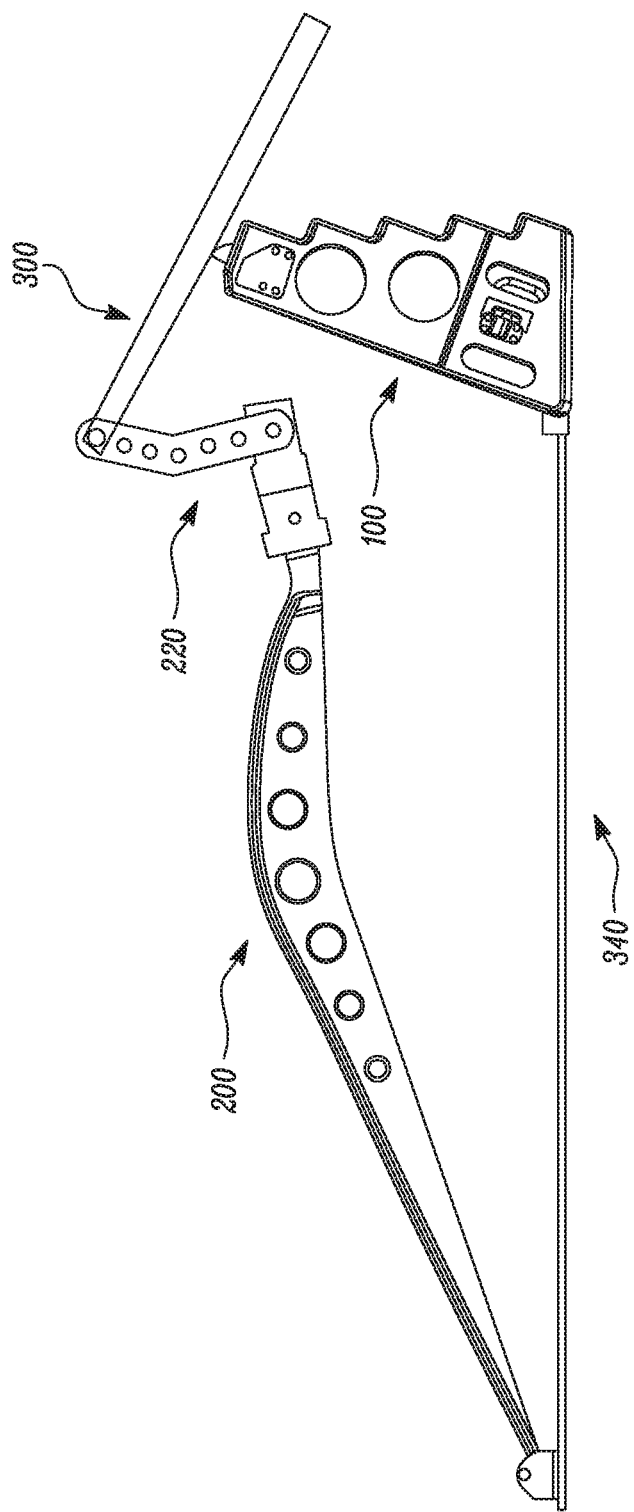
FIG. 16 shows a side view of the step chock open in the "Toe up" configuration being used as a fulcrum to balance a lever to be coupled with a lever adapter device to lift a vehicle or other object.

There are multiple uses for step chock 100. In the "Toe up" configuration, as depicted in FIG. 15 and FIG. 16, a first step chock 100 may operate as a fulcrum for a lever adaptor device such as lever adaptor device 200 and lever such as 300 utilized in the initial lifting a vehicle as depicted in FIG. 16.

Step chock 100 may be coupled to and balancing on a fulcrum such as fulcrum 320. There are times where an operator of lever adapter device 200 may not be in possession or have easy access to the various specialized jacks useful in lifting vehicles or other objects. In such a situation, a lever adaptor device 200 coupled to the lever 300, disposed over fulcrum 320 may suffice to quickly and safely lift a vehicle or other object. Accordingly, an operator may couple lever adapter device 200 to lever 300 by an attachment piece such as attachment piece 220 to a body of lever 300. In one embodiment, lever 300 may include a designated slot for inserting a position-locking pin, into the slot of lever 300 and also through the designated slot located in the frame of attachment piece 220. Straps such as strap 340 may be configured to allow the operator to strap step chock 100 to lever adapter device 200 to prevent the base of lever adapter device 200 from kicking out.

Afterwards, the operator (with or without the assistance of other individuals) may determine a suitable location beneath a vehicle or other object for sliding lever adapter device 200 beneath the vehicle or other object. Then, the operator may apply force to the free end of lever 300 to cause lever adapter device 200 to raise the vehicle or other object such that lever adaptor device 200 makes contact with an underside of the vehicle or other object. If one applies sufficient force to the end of lever 300, the operator may be able to at least nominally and minimally raise the vehicle or other object to provide some space for one or more other operators to place a second and third step chock underneath the vehicle whereby the second and third step chocks may be in the "Step up", "Wedge up" or "Toe up" configurations depending on the need of the rescue operation or the situation at hand.

In some embodiments the vehicle may be lifted to a certain height whereby one or more step chocks are positioned under the vehicle in the "Step up" or "Wedge up" configuration initially to assist the operators in lifting the vehicle whereby then the vehicle may be lifted further whereby step chocks may be orientated in the "Toe up" configuration to provide for greater space underneath the vehicle. Thus, the embodiment shown is shown to illustrate that there may be scenarios where the step chock may still be useful (particularly in emergency rescue operations where it is critical to access trapped individuals as quickly and as safely as possible).

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the use contemplated. The scope of the invention is to be defined by the above claims.

What is claimed is:

1. A step chock comprising:
   a first leg having a first top surface, a first bottom surface, a first front surface, and a first rear surface, wherein the first top surface includes a first series of steps increasing in elevation along a first direction from the first front surface toward the first rear surface, the first series of steps including a plurality of treads and a plurality of risers, wherein each of the plurality of treads is parallel to the first bottom surface;
   a second leg having a second top surface, a second bottom surface, a second front surface, and a second rear surface, wherein the second top surface includes a second series of steps increasing in elevation along a second direction from the second front surface toward the second rear surface; and
   one or more hinges rotatably coupling the first leg and the second leg such that the step chock defines a first configuration and a second configuration, and the step chock transitions from one of the first configuration and the second configuration to the other of the first configuration and the second configuration via rotation of at least one of the first leg and the second leg relative to the other of the first leg and the second leg about an axis of the one or more hinges,
   wherein when in the second configuration the step chock includes at least two orientations in which the step chock is configured to provide support for a load, the at least two orientations including: 1) a step up orientation in which the first bottom surface and the second bottom surface are configured to contact a ground surface and both the first series of steps and the second series of steps are configured to contact the load; and 2) a toe up configuration in which the first rear surface and the second rear surface are configured to contact the ground surface and both the first front surface and the second front surface are configured to contact the load.

2. The step chock of claim 1, wherein when the step chock is in the second configuration the first direction is angularly offset from the second direction by an angle between 20 degrees and 50 degrees.

3. The step chock of claim 1, wherein both the first front surface and the second front surface include a respective first portion and a respective second portion, the first portion of the first front surface angularly offset from the second portion of the first front surface, and the first portion of the second front surface angularly offset from the second portion of the second front surface.

4. The step chock of claim 1, wherein at least one of the first and second top surfaces, the first and second bottom surfaces, the first and second front surfaces, and the first and second rear surfaces is textured to prevent slippage between the textured surface and an object supported by the step chock via direct contact with the textured surface.

5. The step chock of claim 1 wherein:
   the first direction is parallel to the second direction when the step chock is in the first configuration; and
   the first direction is angularly offset with respect to the second direction when the step chock is in the second configuration.

6. The step chock of claim 5, comprising a swinging link mechanism, the swinging link mechanism having a first position and a second position, such that when the swinging link mechanism is in the first position the first leg and the second leg are lockable in the first configuration, and when the swinging link mechanism is in the second position, the first leg and the second leg are lockable in the second configuration.

7. The step chock of claim 5, wherein when the step chock is in the first configuration the first plurality of risers are parallel to the second plurality of risers.

8. The step chock of claim 1, wherein the one or more hinges includes a plurality of leaves, the plurality of leaves including a first leaf and a second leaf, the first leaf having a first protrusion, the first leaf attached to one of the first leg and the second leg, the second leaf having a second protrusion, and the second leaf attached to the other of the first leg and the second leg.

9. The step chock of claim 1, wherein both the first bottom surface and the second bottom surface lie within a plane, and the axis of the one or more hinges is normal to the plane.

10. The step chock of claim 1, wherein at least a portion of the first rear surface is oblique to the first bottom surface.

11. The step chock of claim 1 wherein when in the second configuration the step chock includes a third orientation in which the step chock is configured to provide support for the load, and the third orientation includes a wedge up orientation in which both the first top surface and the second top surface are configured to contact the ground surface, and both the first bottom surface and the second bottom surface are configured to contact the load.

12. A method of stabilizing a vehicle or other object using a step chock, the method comprising:
   increasing a height of the vehicle or other object relative to a ground surface upon which the vehicle or other object was resting;
   rotating a first leg of the step chock relative to a second leg of the step chock about an axis thereby transitioning the step chock from a first configuration in which the first leg is parallel to the second leg to a second configuration in which the first leg is angularly offset with respect to the second leg; and
   subsequent to increasing the height of the vehicle or other object:
      contacting a first bottom surface of the first leg and a second bottom surface of the second leg with the ground surface, wherein the first bottom surface and the second bottom surface are both parallel to a first plane, and the first plane intersects the axis;
      contacting a step of a first series of steps of a first top surface of the first leg with the vehicle or other object, wherein each of the steps of the first series of steps is parallel to a second plane, and the second plane intersects the axis;
      contacting a step of a second series of steps of a second top surface of the second leg with the vehicle or other object, wherein each of the steps of the second series of steps is parallel to the second plane;
   releasing a position-locking pin from a first holding member fixed to the second leg, thereby enabling the first leg to rotate relative to the second leg about the axis; and
   rotating a swivel link from a first position to a second position, such that in the second position a hole of the swivel link is axially aligned with a hole of a second holding member fixed to the second leg;
   wherein the first series of steps includes a first step, a second step, and a third step, and when contacting the first bottom surface with the ground surface the first step is higher than the second step and the third step is higher than the first step.

13. The method of claim 12, further comprising inserting the position-locking pin into the second holding member fixed to the second leg, the position-locking pin securing the swivel link in the second position to the second holding member, securing the first leg and second leg at an angle.

14. The method of claim 12 wherein:
prior to increasing the height of the vehicle or other object, the vehicle or other object is at an original height with respect to the ground surface; and
positioning the step chock underneath the vehicle or other object blocks the vehicle or other object from lowering to the original height.

15. The method of claim 12 further comprising:
contacting the first step of the first series of steps with the vehicle or other object; and
contacting one of the steps of the second series of steps with the vehicle or other object.

16. A method of stabilizing a vehicle or other object using a step chock, the method comprising:
increasing a height of the vehicle or other object relative to a ground surface upon which the vehicle or other object was resting;
rotating a first leg of the step chock relative to a second leg of the step chock about an axis thereby transitioning the step chock from a first configuration in which the first leg is parallel to the second leg to a second configuration in which the first leg is angularly offset with respect to the second leg; and
subsequent to increasing the height of the vehicle or other object:
positioning the step chock underneath the vehicle or other object such that a portion of the step chock contacts the vehicle or other object;
contacting both a first series of steps of a first top surface of the first leg and a second series of steps of a second top surface of the second leg with the ground surface; and
facing a first bottom surface of the first leg and a second bottom surface of the second leg toward the vehicle or other object.

17. A method of stabilizing a vehicle or other object using a step chock, the method comprising:
increasing a height of the vehicle or other object relative to a ground surface upon which the vehicle or other object was resting;
rotating a first leg of the step chock relative to a second leg of the step chock about an axis thereby transitioning the step chock from a first configuration in which the first leg is parallel to the second leg to a second configuration in which the first leg is angularly offset with respect to the second leg; and
subsequent to increasing the height of the vehicle or other object:
positioning the step chock underneath the vehicle or other object such that a portion of the step chock contacts the vehicle or other object; and
contacting a first rear surface of the first leg and a second rear surface of the second leg with the ground surface wherein both the first rear surface and the second rear surface are oblique with respect to the axis.

18. A method of stabilizing an object positioned above a surface, the method comprising:
providing a step chock including:
a first leg having a first top surface, a first bottom surface opposite the first top surface, a first front surface, and a first rear surface, the first top surface including a first series of steps increasing in elevation along a first direction from the first front surface toward the first rear surface, and the first series of steps including a plurality of treads and a plurality of risers, wherein the plurality of treads are parallel to the first bottom surface, and wherein the first rear surface is oblique to the first bottom surface; and
a second leg having a second top surface, a second bottom surface, a second front surface, and a second rear surface, wherein the second top surface includes a second series of steps increasing in elevation along a second direction from the second front surface toward the second rear surface; and
positioning the step chock beneath the object such that both the first rear surface and the second rear surface contact the surface, and both the first front surface and the second front surface contact the object.

* * * * *